United States Patent
Gole

(10) Patent No.: US 11,797,377 B2
(45) Date of Patent: Oct. 24, 2023

(54) EFFICIENT PARITY DETERMINATION IN ZONED SOLID-STATE DRIVES OF A STORAGE SYSTEM

(71) Applicant: NETAPP, INC., San Jose, CA (US)

(72) Inventor: Abhijeet Prakash Gole, Cupertino, CA (US)

(73) Assignee: NETAPP, INC., San Jose, CA (US)

( * ) Notice: Subject to any disclaimer, the term of this patent is extended or adjusted under 35 U.S.C. 154(b) by 41 days.

(21) Appl. No.: 17/494,684

(22) Filed: Oct. 5, 2021

(65) Prior Publication Data

US 2023/0107466 A1 Apr. 6, 2023

(51) Int. Cl.
G06F 11/10 (2006.01)
G06F 3/06 (2006.01)
G06F 11/00 (2006.01)
H03M 13/00 (2006.01)

(52) U.S. Cl.
CPC .......... *G06F 11/1004* (2013.01); *G06F 3/065* (2013.01); *G06F 3/0614* (2013.01); *G06F 3/0647* (2013.01); *G06F 3/0689* (2013.01)

(58) Field of Classification Search
CPC .. G06F 11/1004; G06F 3/0614; G06F 3/0647; G06F 3/065; G06F 3/0689
See application file for complete search history.

(56) References Cited

U.S. PATENT DOCUMENTS

| | | |
|---|---|---|
| 5,664,187 A | 9/1997 | Burkes et al. |
| 6,101,615 A | 8/2000 | Lyons |
| 8,074,021 B1 | 12/2011 | Miller et al. |
| 8,463,991 B2 | 6/2013 | Colgrove et al. |
| 8,549,222 B1 | 10/2013 | Kleiman et al. |
| 8,775,868 B2 | 7/2014 | Colgrove et al. |
| 8,832,373 B2 | 9/2014 | Colgrove et al. |
| 8,850,108 B1 | 9/2014 | Hayes et al. |
| 8,862,820 B2 | 10/2014 | Colgrove et al. |
| 9,003,144 B1 | 4/2015 | Hayes et al. |
| 9,021,297 B1 | 4/2015 | Hayes et al. |
| 9,134,917 B2 | 9/2015 | Kimmel et al. |
| 9,201,600 B1 | 12/2015 | Hayes et al. |
| 9,218,244 B1 | 12/2015 | Hayes et al. |

(Continued)

FOREIGN PATENT DOCUMENTS

EP 1343087 A2 9/2003

OTHER PUBLICATIONS

International Preliminary Report on Patentability for Application No. PCT/US2021/028879, dated Oct. 25, 2022, 6 pages.

(Continued)

*Primary Examiner* — Justin R Knapp
(74) *Attorney, Agent, or Firm* — LOZA & LOZA, LLP; Tejinder Singh

(57) ABSTRACT

Methods and systems for a storage environment are provided. One method includes copying a data unit from a first temporary storage location corresponding to each zoned solid-state drive (ZNS SSD) of a first ZNS SSD set of a storage system to a first XOR module, while determining a first partial horizontal parity using the data unit stored in the first temporary storage location; and determining a vertical parity for each ZNS SSD of the first ZNS SSD set using the data unit provided to the first XOR module in a current cycle and vertical parity determined from a previous cycle.

20 Claims, 12 Drawing Sheets

(56) References Cited

U.S. PATENT DOCUMENTS

| | | | |
|---|---|---|---|
| 9,229,808 | B2 | 1/2016 | Colgrove et al. |
| 9,244,769 | B2 | 1/2016 | Colgrove et al. |
| 9,367,243 | B1 | 6/2016 | Hayes et al. |
| 9,483,346 | B2 | 11/2016 | Davis et al. |
| 9,495,255 | B2 | 11/2016 | Davis et al. |
| 9,525,738 | B2 | 12/2016 | Hayes et al. |
| 9,563,506 | B2 | 2/2017 | Hayes et al. |
| 9,588,842 | B1 | 3/2017 | Sanvido et al. |
| 9,594,633 | B2 | 3/2017 | Colgrove et al. |
| 9,672,125 | B2 | 6/2017 | Botes et al. |
| 9,672,905 | B1 | 6/2017 | Gold et al. |
| 9,798,477 | B2 | 10/2017 | Botes et al. |
| 9,880,899 | B2 | 1/2018 | Davis et al. |
| 9,934,089 | B2 | 4/2018 | Hayes et al. |
| 9,967,342 | B2 | 5/2018 | Colgrove et al. |
| 10,095,701 | B1 | 10/2018 | Faibish et al. |
| 10,180,879 | B1 | 1/2019 | Colgrove et al. |
| 10,248,516 | B1 | 4/2019 | Sanvido et al. |
| 10,303,547 | B2 | 5/2019 | Hayes et al. |
| 10,353,777 | B2 | 7/2019 | Bernat et al. |
| 10,372,506 | B2 | 8/2019 | Baptist et al. |
| 10,379,763 | B2 | 8/2019 | Colgrove et al. |
| 10,387,247 | B2 | 8/2019 | Baptist et al. |
| 10,387,250 | B2 | 8/2019 | Resch et al. |
| 10,387,256 | B2 | 8/2019 | Dhuse et al. |
| 10,402,266 | B1 | 9/2019 | Kirkpatrick et al. |
| 10,417,092 | B2 | 9/2019 | Brennan et al. |
| 10,432,233 | B1 | 10/2019 | Colgrove et al. |
| 10,437,673 | B2 | 10/2019 | Baptist et al. |
| 10,437,678 | B2 | 10/2019 | Resch |
| 10,452,289 | B1 | 10/2019 | Colgrove et al. |
| 10,467,107 | B1 | 11/2019 | Abrol et al. |
| 10,489,256 | B2 | 11/2019 | Hayes et al. |
| 10,503,598 | B2 | 12/2019 | Trichardt et al. |
| 10,521,120 | B1 | 12/2019 | Miller et al. |
| 10,530,862 | B2 | 1/2020 | Isely et al. |
| 10,534,661 | B2 | 1/2020 | Resch |
| 10,572,176 | B2 | 2/2020 | Davis et al. |
| 10,579,450 | B2 | 3/2020 | Khadiwala et al. |
| 10,606,700 | B2 | 3/2020 | Alnafoosi et al. |
| 10,613,974 | B2 | 4/2020 | Dreier et al. |
| 10,656,871 | B2 | 5/2020 | Peake |
| 10,657,000 | B2 | 5/2020 | Resch |
| 10,671,480 | B2 | 6/2020 | Hayes et al. |
| RE48,222 | E | 9/2020 | Colgrove et al. |
| 10,776,204 | B2 | 9/2020 | Resch et al. |
| 10,810,083 | B1 | 10/2020 | Colgrove et al. |
| 10,817,375 | B2 | 10/2020 | Colgrove et al. |
| 10,838,834 | B1 | 11/2020 | Sanvido et al. |
| 10,860,424 | B1 | 12/2020 | Dhuse et al. |
| 10,891,192 | B1 | 1/2021 | Brennan et al. |
| RE48,448 | E | 2/2021 | Colgrove et al. |
| 11,269,778 | B1 | 3/2022 | Kanteti |
| 11,340,987 | B1 | 5/2022 | Gole et al. |
| 11,442,646 | B2* | 9/2022 | Agarwal .............. G06F 3/0673 |
| 2006/0129873 | A1* | 6/2006 | Hafner ............... G06F 11/1076 |
| | | | 714/E11.034 |
| 2006/0242539 | A1* | 10/2006 | Kang ...................... G11C 11/22 |
| | | | 714/763 |
| 2010/0332401 | A1 | 12/2010 | Prahlad et al. |
| 2012/0084506 | A1 | 4/2012 | Colgrove et al. |
| 2012/0151118 | A1 | 6/2012 | Flynn et al. |
| 2014/0281227 | A1 | 9/2014 | Herron et al. |
| 2015/0169244 | A1 | 6/2015 | Asnaashari et al. |
| 2015/0199151 | A1 | 7/2015 | Klemm et al. |
| 2016/0313943 | A1 | 10/2016 | Hashimoto et al. |
| 2016/0342470 | A1 | 11/2016 | Cudak et al. |
| 2017/0124345 | A1 | 5/2017 | Christiansen et al. |
| 2017/0220264 | A1 | 8/2017 | Sokolov et al. |
| 2019/0004964 | A1 | 1/2019 | Kanno |
| 2019/0018788 | A1 | 1/2019 | Yoshida et al. |
| 2019/0278663 | A1 | 9/2019 | Mehta et al. |
| 2020/0089407 | A1 | 3/2020 | Baca et al. |
| 2020/0394112 | A1 | 12/2020 | Gupta et al. |
| 2020/0409589 | A1 | 12/2020 | Bennett et al. |
| 2020/0409601 | A1 | 12/2020 | Helmick et al. |
| 2021/0081273 | A1 | 3/2021 | Helmick et al. |
| 2021/0081330 | A1 | 3/2021 | Bennett et al. |
| 2021/0132827 | A1 | 5/2021 | Helmick et al. |
| 2021/0303188 | A1 | 9/2021 | Bazarsky et al. |
| 2021/0334006 | A1 | 10/2021 | Singh et al. |
| 2022/0027051 | A1 | 1/2022 | Kant et al. |
| 2022/0137844 | A1 | 5/2022 | Goss et al. |
| 2022/0197553 | A1 | 6/2022 | Benhanokh et al. |
| 2022/0229596 | A1 | 7/2022 | Jung |
| 2022/0244869 | A1 | 8/2022 | Kanteti |
| 2022/0283900 | A1 | 9/2022 | Gole et al. |
| 2022/0291838 | A1* | 9/2022 | Gorobets .............. G06F 11/108 |
| 2023/0082636 | A1* | 3/2023 | Zhu ..................... G06F 11/1451 |

OTHER PUBLICATIONS

International Search Report and Written Opinion for International Application No. PCT/US2021/028879, dated Aug. 5, 2021, 8 pages.

Mao, B., et al., "HPDA: A Hybrid Parity-Based Disk Array for Enhanced Performance and reliability," ACM Transactions on Storage (TOS), vol. 8, No. 1, Publication [online], Feb. 2012 [retrieved Apr. 4, 2016). Retrieved from the Internet: URL: http://or.nsfc.gov.cn/bitstream/00001903-5/90177/1/1000003549834.pdf, 20 pages.

Notice of Allowance on co-pending US application (U.S. Appl. No. 17/727,511) dated Dec. 14, 2022.

Notice of Allowance on co-pending US application (U.S. Appl. No. 16/858,019) dated Dec. 20, 2022.

European Search Report for Application No. EP22157793 dated Jul. 19, 2022, 16 pages.

Non-Final Office Action on co-pending US application (U.S. Appl. No. 17/650,940) dated Feb. 16, 2023.

Dholakia et al.; "A New Intra-disk Redundancy Scheme for High-Reliability RAID Storage Systems in the Presence of Unrecoverable Errors"; ACM Transactions on Storage, vol. 4, No. 1, Article 1; May 2008; 42 pages.

NetApp, Inc.; "V-Series Systems Hardware Maintenance Guide"; Jul. 2006; Part No. 210-00975_A0; 202 pages.

NetApp, Inc.; "Date ONTAP® 7.3 Core Commands Quick Reference"; Jun. 2008; Part No. 215-03893_A0; 1 page.

NetApp, Inc.; "Data ONTAP® 7.3 Documentation Roadmap"; Jul. 9, 2008; Part No. 210-04229_A0; 8 pages.

NetApp, Inc.; "Data ONTAP® 7.3 File Access and Protocols Management Guide"; Sep. 10, 2009; Part No. 210-04505_B0; 382 pages.

NetApp, Inc ; "V-Series Systems Implementation Guide for Hitachi® Storage"; Dec. 2009; Part No. 210-04694_A0; 66 pages.

NetApp, Inc.; "V-Series Systems MetroCluster Guide"; Jul. 2009; Part No. 210-04515_A0; 80 pages.

NetApp, Inc.; "Data ONTAP® 7.3 Archive and Compliance Management Guide"; Mar. 4, 2010; Part No. 210-04827_A0; 180 pages.

NetApp, Inc.; "Data ONTAP® 7.3 Block Access Management Guide for iSCSI and FC"; Mar. 4, 2010; Part No. 210-04752_B0; 202 pages.

NetApp, Inc.; "Data ONTAP® 7.3 Data Protection Tape Backup and Recovery Guide"; Jan. 15, 2010; Part No. 210-04762_A0; 142 pages.

NetApp, Inc.; "Data ONTAP® 7.3 MultiStore Management Guide"; Mar. 4, 2010; Part No. 210-04855_A0; 144 pages.

NetApp, Inc.; "Data ONTAP® 7.3 Network Management Guide"; Jan. 15, 2010; Part No. 210-04757_A0; 222 pages.

NetApp, Inc.; "Data ONTAP® 7.3 Software Setup Guide"; Nov. 4, 2010; Part No. 210-05045_A0; 116 pages.

NetApp, Inc.; "Data ONTAP® Storage Efficiency Management Guide"; Mar. 4, 2010; Part No. 210-04856_A0; 76 pages.

NetApp, Inc.; "Data ONTAP® 7.3 System Administration Guide"; Nov. 11, 2010; Part No. 210-05043_A0; 350 pages.

NetApp, Inc.; "Data ONTAP® 7.3 Upgrade Guide"; Nov. 11, 2010; Part No. 210-05042_A0; 200 pages.

NetApp, Inc.; "Notices"; 2010; Part No. 215-05705_A0; 46 pages.

NetApp, Inc.; "V-Series Systems Installation Requirements and Reference Guide"; Oct. 2010; Part No. 210-05064_A0; 214 pages.

(56) References Cited

OTHER PUBLICATIONS

NetApp, Inc.; "Data ONTAP® 7.3 Active/Active Configuration Guide"; Jun. 16, 2011; Part No. 210-05247_A0; 214 pages.
NetApp, Inc.; "Data ONTAP® 7.3 Data Protection Online Backup and Recovery Guide"; Feb. 22, 2011; Part No. 210-05212_A0; 432 pages.
NetApp, Inc.; "Data ONTAP® 7.3.7 Release Notes"; May 31, 2012; Part No. 215-06916_A0; 182 pages.
NetApp, Inc.; "Data ONTAP® 7.3 Storage Management Guide"; May 3, 2012; Part No. 210-04766_B0; 356 pages.
International Search Report and Written Opinion, International Patent Application No. PCT/US2022/049431, dated Mar. 3, 2023, 13 pgs.
Notice of Allowance on co-pending US application (U.S. Appl. No. 17/192,606) dated Jan. 28, 2022.
Bo Mao et al.; "HPDA: A Hybrid Parity-Based Disk Array for Enhanced Performance and Reliability"; May 2020; 13 pages; https://www.researchgate.net/publication/224140602.
"NVM Express Base Specification"; Mar. 9, 2020; Revision 1.4a; NVM Express Workgroup; 405 pages.
Non-Final Office Action dated May 15, 2023 for U.S. Appl. No. 17/650,936, filed Feb. 14, 2022, 19 pages.
Notice of Allowance dated Mar. 1, 2023 for U.S. Appl. No. 17/727,511, filed Apr. 22, 2022, 15 pages.
Non-Final Office Action for Co-pending U.S. Appl. No. 17/456,012 dated Apr. 18, 2023.
Notice of Allowance dated Jun. 16, 2023 for U.S. Appl. No. 16/858,019, filed Apr. 24, 2020, 10 pages.
Notice of Allowance dated Jul. 19, 2023 for U.S. Appl. No. 17/650,940, filed Feb. 14, 2022, 9 pages.
Notice of Allowance dated Aug. 30, 2023 for U.S. Appl. No. 17/456,012, filed Nov. 22, 2021, 10 pages.

* cited by examiner

EFFICIENT PARITY DETERMINATION IN ZONED SOLID-STATE DRIVES OF A STORAGE SYSTEM

TECHNICAL FIELD

The present disclosure relates to storage environments and more particularly, to determining horizontal and vertical parity for data stored in zoned solid-state drives of a RAID (redundant array of independent disks) system.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices operating in a group of a storage sub-system. The storage devices (may also be referred to as "disks") within a storage system are typically organized as one or more groups (or arrays), wherein each group is operated as a RAID.

Most RAID implementations enhance reliability/integrity of data storage through redundant writing of data "stripes" across a given number of physical drives in the RAID group and storing parity data associated with striped data in dedicated parity drives. A storage device may fail in a storage sub-system. Data can be lost when one or more storage devices fail. The parity data is used to protect against loss of data in a RAID group. RAID6 and RAID-DP (RAID-Dual Parity) type protection is typically employed to protect RAID groups against dual drive failures.

Computing parity can be resource intensive because it uses computing resources, including storage server processors and memory units (e.g., a cache). Continuous efforts are being made to develop technology for efficiently computing parity in a RAID system, especially in a RAID system with solid state drives (SSDs).

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

Figure 1A:
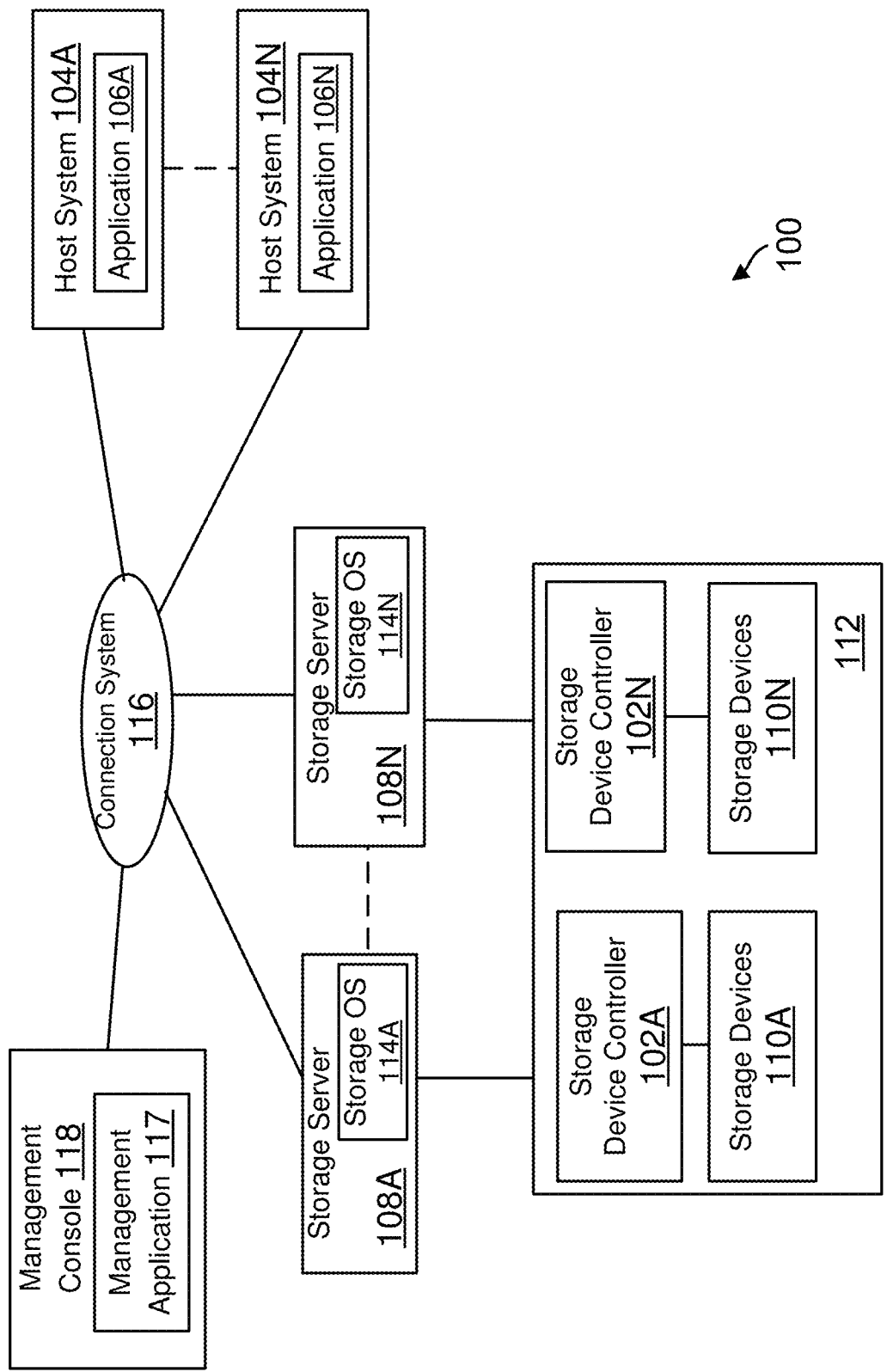
FIG. 1A shows an example of an operating environment for the various aspects disclosed herein.

In one aspect, innovative technology is disclosed for efficiently generating horizontal and vertical parity for data stored at zoned namespace solid state drives ("ZNS SSDs") in a RAID configuration. A ZNS SSD has individual media units ("MUs") that operate independent of each other to store information. Storage space at each ZNS SSD is exposed as zones. The zones are configured using the independent MUs, which enables the MUs to operate as individual drives of a RAID group. A first tier RAID layer configures the storage space of ZNS SSDs into physical zones ("PZones") spread uniformly across the MUs. Each MU is configured to include a plurality of PZones. The first tier RAID layer configures a plurality of RAID zones ("RZones"), each having a plurality of PZones. The RZones are presented to other layers, e.g., a tier 2 RAID layer that interfaces with a file system to process read and write requests. The tier 2 RAID layer and the file system manager only see the RZone, and the tier 1 layer manages data at the PZone level.

Horizontal parity is determined by XORing data stored across a horizontal stripe having a plurality of RZones (one from each SSD in the tier 2 RAID layer). The horizontal parity data is stored at a single parity ZNS SSD. Vertical parity is determined for data stored at each ZNS SSD and stored within a parity PZone of each ZNS SSD. If a block or a MU fails, then the parity data stored at the individual ZNS SSD, or the parity drive is used to reconstruct data. This provides RAID-6 and RAID-DP type parity protection without having to use two or more dedicated parity drives.

In one aspect, innovative technology is disclosed for determining vertical parity for each ZNS SSD of a RAID group and horizontal (or row) parity for data stored across a plurality of rows of the ZNS SSDs by reducing cache line reloading. To determine horizontal parity, data stored within a data page of each ZNS SSD is loaded into a cache line of a cache of a storage server. Data from the cache line is loaded into a horizontal parity register corresponding to each ZNS SSD and then XORed to determine horizontal parity. Simultaneously, data from the horizontal parity register is provided to a vertical parity XOR module for each ZNS SSD. The vertical parity XOR module XORs the data received from the horizontal parity register for a current cycle and a vertical parity from a previous cycle to determine the vertical parity for the current cycle. The vertical parity XOR module continues to cycle through until data stored by a last row of the ZNS SSD has been XORed. This process is efficient because vertical parity and horizontal parity are determined within a same cycle by continuously transferring data from a cache line to a horizontal parity register, a horizontal parity XOR module and the vertical parity XOR module without having to expend additional processing cycles in cache line reloading as described below in detail.

The innovative technology is also advantageous in a multi-processor environment, where multiple ZNS SSDs are assigned to each processor. For example, a first processor is assigned to a first set of ZNS SSDs. The first processor determines the horizontal parity (P1) for data stored across each ZNS SSDs. The first processor also determines the vertical parity for each ZNS SSD. A second processor is assigned to a second set of ZNS SSDs. The second processor determines the horizontal parity (P2) for data stored across each ZNS SSDs. The second processor also determines the vertical parity for each ZNS SSD. A third processor takes P1 and P2 of each row of data stored by the ZNS SSDs of the first set and the second set to determine the horizontal parity across both sets of ZNS SSDs. The third processor also determines the vertical parity based on the horizontal parity determined by the third processor, as described below in detail.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive, EEPROM (electrically erasable programmable read only memory), memory stick or any other storage device type, in accordance with the claimed subject matter.

System 100: FIG. 1A shows an example of a networked operating environment 100 (also referred to as system 100) used according to one aspect of the present disclosure. As an example, system 100 may include a plurality of storage servers 108A-108N (may also be referred to as storage server/storage servers/storage controller/storage controllers 108) executing a storage operating system 114A-114N (may also be referred to as storage operating system 114 or storage operating systems 114), a plurality of computing systems 104A-104N (may also be referred to as server system/server systems 104 or as host system/host systems 104) that may access storage space provided by a storage-subsystem 112 managed by the storage servers 108 via a connection system 116 such as a local area network (LAN), wide area network (WAN), the Internet and others. The storage-subsystem 112 includes a plurality of storage devices 110A-110N (may also be referred to as storage device/storage devices/disk/disks 110) described below in detail. In one aspect, storage devices 110 are ZNS SSDs and are referred to as ZNS SSD or ZNS SSDs 110, as described below in detail. It is noteworthy that the term "disk" as used herein is intended to mean any storage device/space and not to limit the adaptive aspects to any storage device, for example, hard disks.

The server systems 104 may communicate with each other via connection system 116, for example, for working collectively to provide data-access service to user consoles (not shown). Server systems 104 may be computing devices configured to execute applications 106A-106N (may be referred to as application or applications 106) over a variety of operating systems, including the UNIX® and Microsoft Windows® operating systems (without derogation of any third-party rights). Application 106 may include an email exchange application, a database application, or any other type of application. In another aspect, application 106 may comprise a virtual machine. Applications 106 may utilize storage devices 110 to store and access data.

Server systems 104 generally utilize file-based access protocols when accessing information (in the form of files and directories) over a network attached storage (NAS)-based network. Alternatively, server systems 104 may use block-based access protocols, for example but not limited to, the Small Computer Systems Interface (SCSI) protocol encapsulated over TCP (iSCSI) and SCSI encapsulated over Fibre Channel (FCP) to access storage via a storage area network (SAN). TCP stands for Transmission Control Protocol that is used in network communication.

Server 104 may also execute a virtual machine environment, according to one aspect. In the virtual machine environment, a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one aspect, the storage servers 108 use the storage operating system 114 to store and retrieve data from the storage sub-system 112 by accessing the ZNS SSDs 110 via storage device controllers 102A-102N (may also be referred to as disk controller/disk controllers 110). Data is stored and accessed using read and write requests that are also referred to as input/output (I/O) requests.

The storage devices 110 may include writable storage device media such as magnetic disks, video tape, optical, DVD, magnetic tape, non-volatile memory devices for example, self-encrypting drives, flash memory devices, ZNS SSDs and any other similar media adapted to store information. The storage devices 110 may be organized as one or more RAID groups. The various aspects disclosed herein are not limited to any storage device type or storage device configuration.

In one aspect, ZNS SSDs 110 comply with the NVMe (Non-Volatile Memory Host Controller Interface) zoned namespace (ZNS) specification defined by the NVM Express™ (NVMe™) standard organization. An SSD "zone" as defined by the NVMe ZNS standard is a sequence of blocks that can only be written in a sequential fashion and are overwritten by performing a "Zone Erase" or "Zone Reset operation" per the NVMe specification. A ZNS SSD storage space is exposed as zones. MUs of a ZNS SSD operate independent of each other to store information and are managed by the storage device controller 102. The zones are configured using the independent MUs, which enables the MUs to operate as individual drives of a RAID group. This enables the storage sub-system 112 to use a single parity ZNS SSD to store parity data and distribute the parity data within each ZNS SSD of a RAID group.

In one aspect, to facilitate access to ZNS SSDs 110, the storage operating system 114 "virtualizes" the storage space provided by ZNS SSDs 110. The storage server 108 can present or export data stored at ZNS SSDs 110 to server systems 104 as a storage volume or one or more qtree sub-volume units. Each storage volume may be configured to store data files (or data containers or data objects), scripts, word processing documents, executable programs, and any other type of structured or unstructured data. From the perspective of the server systems, each volume can appear to be a single drive. However, each volume can represent the storage space in one storage device, an aggregate of some or all the storage space in multiple storage devices, a RAID group, or any other suitable set of storage space.

The storage server 108 may be used to access information to and from ZNS SSDs 110 based on a request generated by server system 104, a management console (or system) 118 or any other entity. The request may be based on file-based access protocols, for example, the CIFS or the NFS protocol, over TCP/IP (Internet Protocol). Alternatively, the request may use block-based access protocols, for example, iSCSI or FCP.

As an example, in a typical mode of operation, server system 104 transmits one or more input/output (I/O) commands, such as an NFS or CIFS request, over connection system 116 to the storage server 108. The storage operating system 114 generates operations to load (retrieve) the requested data from ZNS 110 if it is not resident "in-core," i.e., at the memory of the storage server. If the information is not in the memory, the storage operating system retrieves a logical volume block number (VBN) that is mapped to a disk identifier and disk block number (Disk, DBN). The DPN is accessed from a ZNS SSD by the storage device controller 102 and loaded in memory for processing by the storage server 108. Storage server 108 then issues an NFS or CIFS response containing the requested data over the connection system 116 to the respective server system 104.

In one aspect, storage server 108 may have a distributed architecture, for example, a cluster-based system that may include a separate network module and storage module.

Briefly, the network module is used to communicate with host platform server system 104 and management console 118, while the storage module is used to communicate with the storage subsystem 112.

The management console 118 executes a management application 117 that is used for managing and configuring various elements of system 100. Management console 118 may include one or more computing systems for managing and configuring the various elements.

Parity Protection: Before describing the details of the present disclosure, a brief overview of parity protection in a RAID configuration will be helpful. A parity value for data stored in storage subsystem 112 can be computed by summing (usually modulo 2) data of a word size (usually one bit) across several similar ZNS SSD holding different data and then storing the results in a parity ZNS SSD. That is, parity may be computed on vectors 1-bit wide, composed of bits in corresponding positions on each ZNS SSD. When computed on vectors 1-bit wide, the parity can be either the computed sum or its complement; these are referred to as even and odd parity, respectively. Addition and subtraction on 1-bit vectors are both equivalent to exclusive-OR (XOR) logical operations. The data is protected against the loss of any one of the ZNS SSDs, or of any portion of the data on any one of the ZNS SSDs. If the ZNS SSD storing the parity is lost, the parity can be regenerated from the data or from parity data stored within each ZNS SSD. If one of the ZNS SSD is lost, the data can be regenerated by adding the contents of the surviving ZNS SSDs together and then subtracting the result from the stored parity data.

Typically, storage devices in a RAID configuration are divided into parity groups, each of which comprises one or more data drive and a parity drive. A parity set is a set of blocks, including several data blocks and one parity block, where the parity block is the XOR of all the data blocks. A parity group is a set of drives from which one or more parity sets are selected. The storage space is divided into stripes, with each stripe containing one block from each drive. The blocks of a stripe are usually at the same locations on each drive in the parity group. Within a stripe, all but one block are blocks containing data ("data blocks") and one block is a block containing parity ("parity block") computed by the XOR of all the data.

Figure 1B:
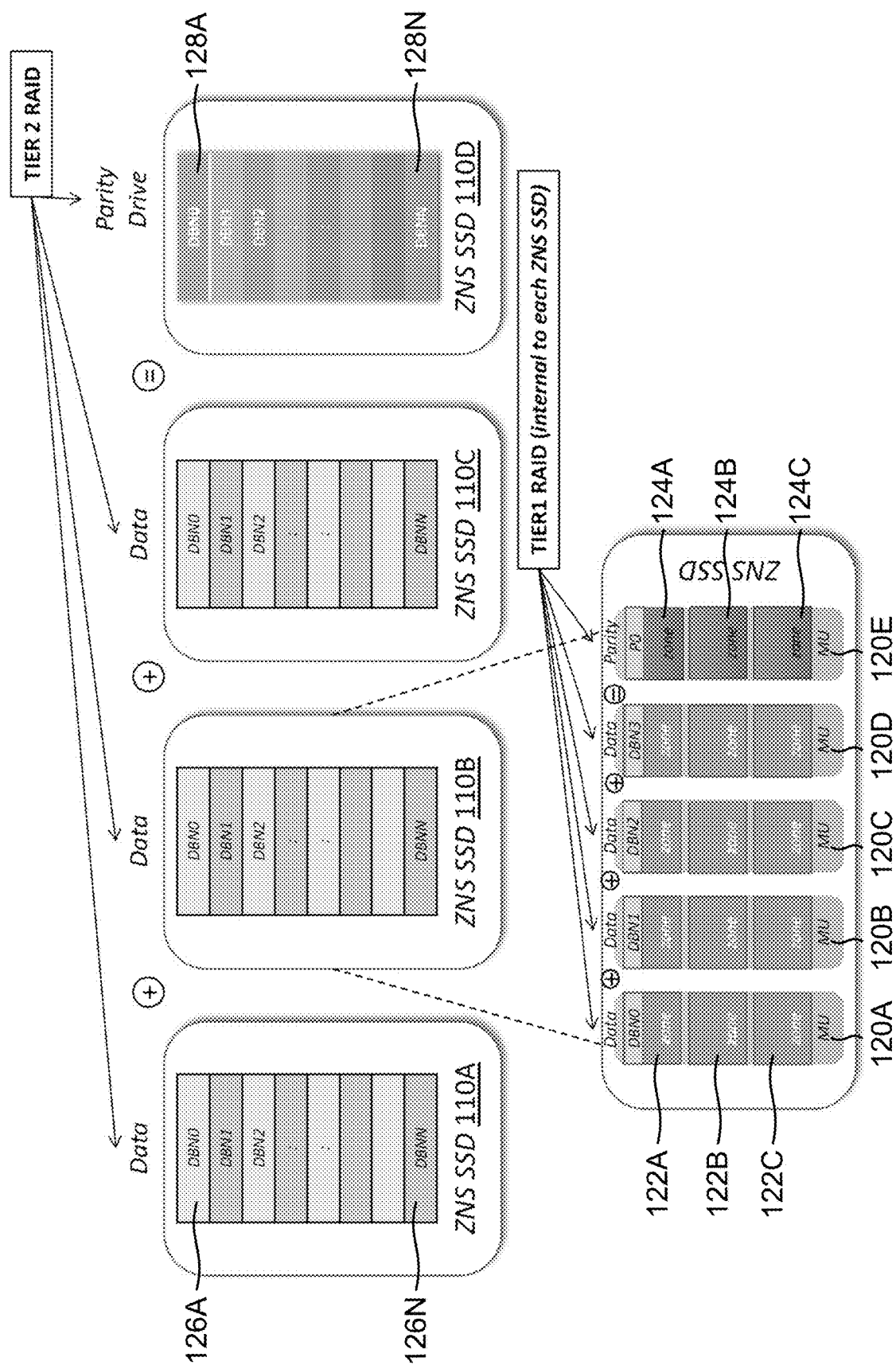
FIG. 1B shows illustrates configuration of ZNS (Zone Namespace) SSDs (solid state drives), according to one aspect of the present disclosure.

ZNS SSD RAID Configuration: FIG. 1B illustrates a Hierarchical RAID implementation providing dual parity protection (e.g., RAID6 and RAID-DP) using a single, ZNS SSD 110D as a parity drive to store parity data, and ZNS SSDs 110A-110C as data drives storing data. Unlike conventional systems that use two parity drives within a RAID group for providing RAID 6 and RAID-DP type protection, only one parity drive 110D is used.

Each ZNS SSD 110A-110D includes a plurality of storage blocks identified by disk block numbers ("DBNs"), shown as DBN0-DBNN (e.g., 126A-126N for ZNS SSD 110A). The parity drive ZNS SSD 110D has similar DBNs shown as 128A-128N for storing parity data. The parity data (also referred to as horizontal parity) is computed by XORing data stored at disk blocks in a horizontal stripe with the same DBN of each ZNS SSD data drive (i.e., 110A-110C). The computed parity is written to the same DBN on the parity drive 110D. For example, the parity for data stored at the first disk (DBN0) of each ZNS SSD 110A-110C is stored at the DBN0 128A of ZNS SSD 110D. This is referred to as TIER2 RAID for providing RAID protection if a ZNS SSD fails or if a block of a ZNS SSD fails.

Vertical parity computed and stored at each ZNS SSD, is referred to as TIER1 RAID. An example of TIER1 RAID is shown for ZNS SSD 110B that includes a plurality of MUs 120A-120E. A plurality of zones is configured for the MUs 120A-120E, e.g., zones 122A-122C are based on MU 120A, while parity zones 124A-124C are based on MU 120E to store parity data. The zones within each ZNS SSD are spread uniformly across the MUs. Parity data (i.e., horizontal parity) for TIER1 RAID is computed across zones and stored at the parity zones 124A-124C within MU 120E. By grouping zones from independent MUs into a RAID stripe, TIER1 RAID can provide data availability even if a block from one of the zones encounters an uncorrectable read error or an entire MU is inaccessible.

Figure 1C:
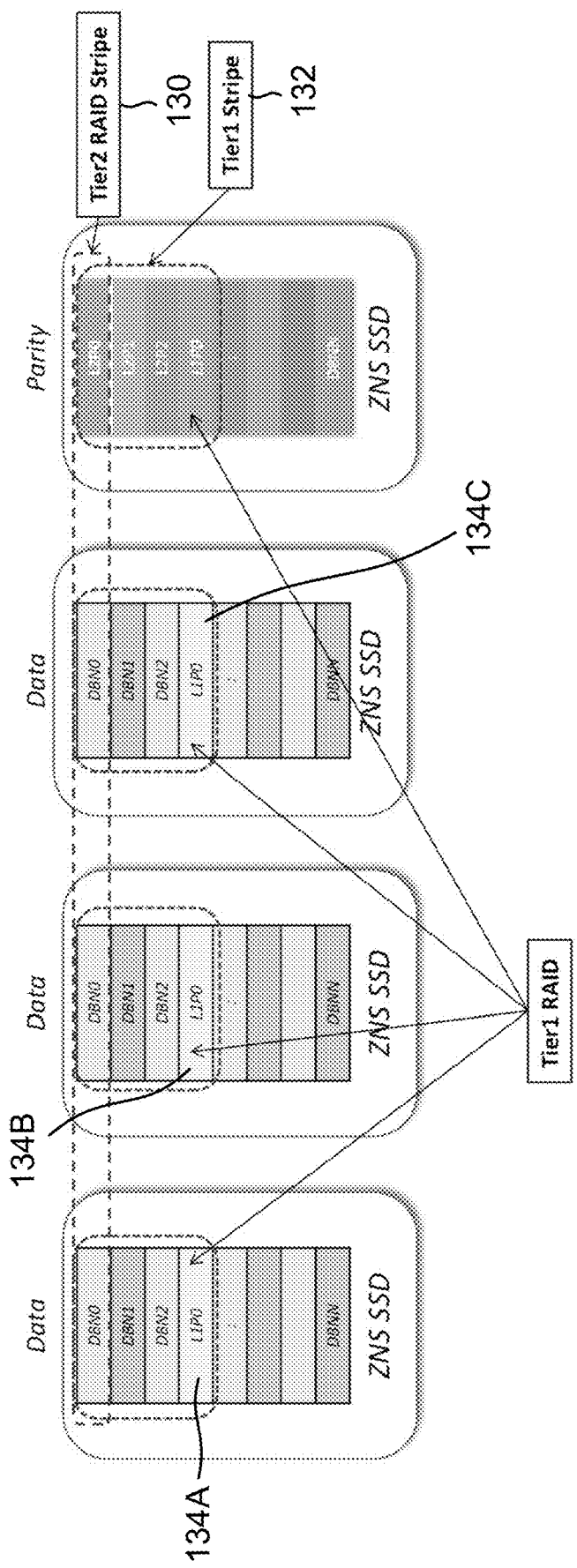
FIG. 1C provides another example of the ZNS SSD configuration, according to one aspect of the present disclosure.

FIG. 1C illustrates another representation of the innovative dual parity architecture having a single ZNS SSD 110D within a RAID group to store horizontal parity data and storing vertical parity data at each ZNS SSD of the RAID group. A horizontal TIER2 RAID stripe is shown within the rectangle 130 and the vertical TIER1 RAID stripe is shown within 132. The vertical TIER1 RAID parity (i.e., vertical parity) is also shown as L1P0 (134A-134C) in ZNS SSDs 110A-110C and written to disk blocks that are internal to each ZNS SSD, i.e., these hidden disk blocks are not visible to upper software layers (such as TIER2 RAID layer 136 and File System 134 shown in FIG. 1D and described below in detail).

Figure 1D:
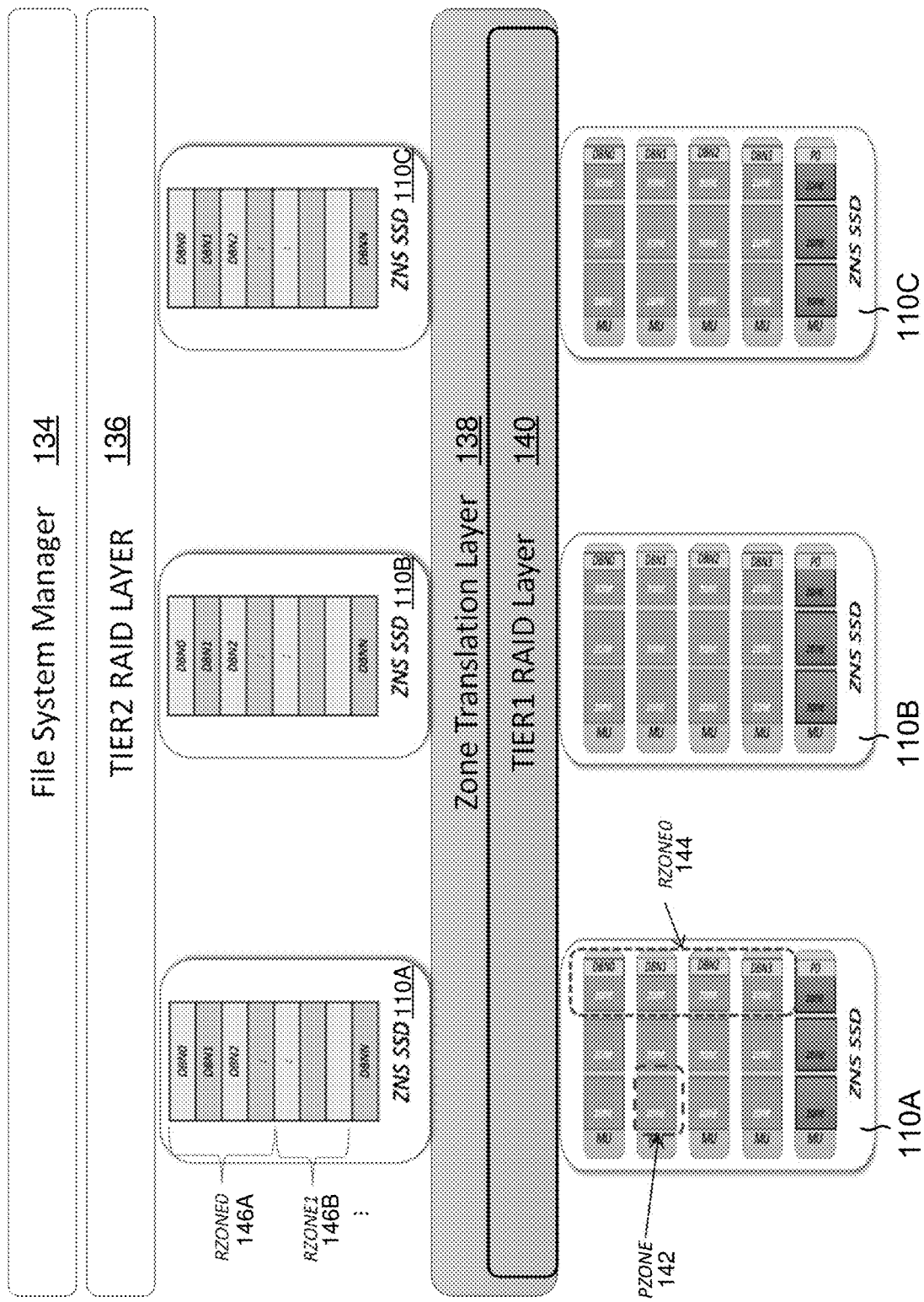
FIG. 1D shows an example of a software architecture for using ZNS SSDs in a storage system, according to one aspect of the present disclosure.

Software Architecture: FIG. 1D shows an example of the innovative software architecture used for implementing the innovative technology of the present disclosure. The architecture includes the file system manager 134 within the storage operating system 114, described in detail below with respect to FIG. 3. The TIER2 RAID layer 136 interfaces with the file system manager 134 for processing I/O requests to read and write data. A zone translation layer (ZTL) 138 with a TIER1 RAID layer 140 operates below the TIER2 RAID layer 136 for managing the zones within the ZNS SSDs 110A-110D. As an example, the total storage capacity of each ZNS SSD is split across physical zones (PZones), e.g., 142 for ZNS SSD 110A visible only to the TIER1 RAID layer 140. The PZones are grouped by MUs, and each MU may contain a plurality of PZones. The TIER1 RAID layer 140 groups PZones across multiple MUs into a RAID-Zone ("RZone", e.g., RZone 0 144 for ZNS SSD 110A). After the TIER1 RAID layer 140 creates the RZones, the ZTL 138 and upper layers can view each ZNS SSD as a collection of RZones e.g., RZone 0 146A and RZone1 146B shown for ZNS SSD 110A.

In one aspect, ZNS SSDs 110A-110D have defined rules for writing to zones. For example, a zone should be "open" for writing and the writes are sequential with increasing block numbers of the zone. To enable multiple processors to write in parallel, the NVMe ZNS standard allows the ZNS SSDs to provide a Zone Random Write Area (ZRWA) for each available zone. The ZRWA is a buffer within a memory where writes to an open zone are gathered before being written to the PZones. ZRWA enables higher software layers (e.g., file system manager 134 and the TIER2 RAID layer 136) to issue sequential write commands without the overhead of guaranteeing that the writes arrive in the sequential order at the ZNS SSD. The data from the ZRWA is moved to the ZNS SSD zones via a "commit operation." An indication for the commit operation is provided by an upper layer software, e.g., the file system manager 134 and/or the TIER2 RAID layer 136. The commit operation may be explicit or implicit. An explicit commit operation happens when a commit command is sent to the ZNS SSD. An implicit operation commits data to a ZNS SSD zone, when the ZNS SSD receives a write command, which if executed would exceed the size of the ZRWA buffer (i.e., when the ZRWA buffer will reach a threshold value).

In one aspect, horizontal and vertical parity, as described below in detail is determined by the TIER2 RAID layer 136. In another aspect, the horizontal and vertical parity is determined by the ZTL 138. In yet another aspect, the horizontal and vertical parity is determined by the TIER1 RAID layer 140 or the storage device controller 102.

Figure 1E:
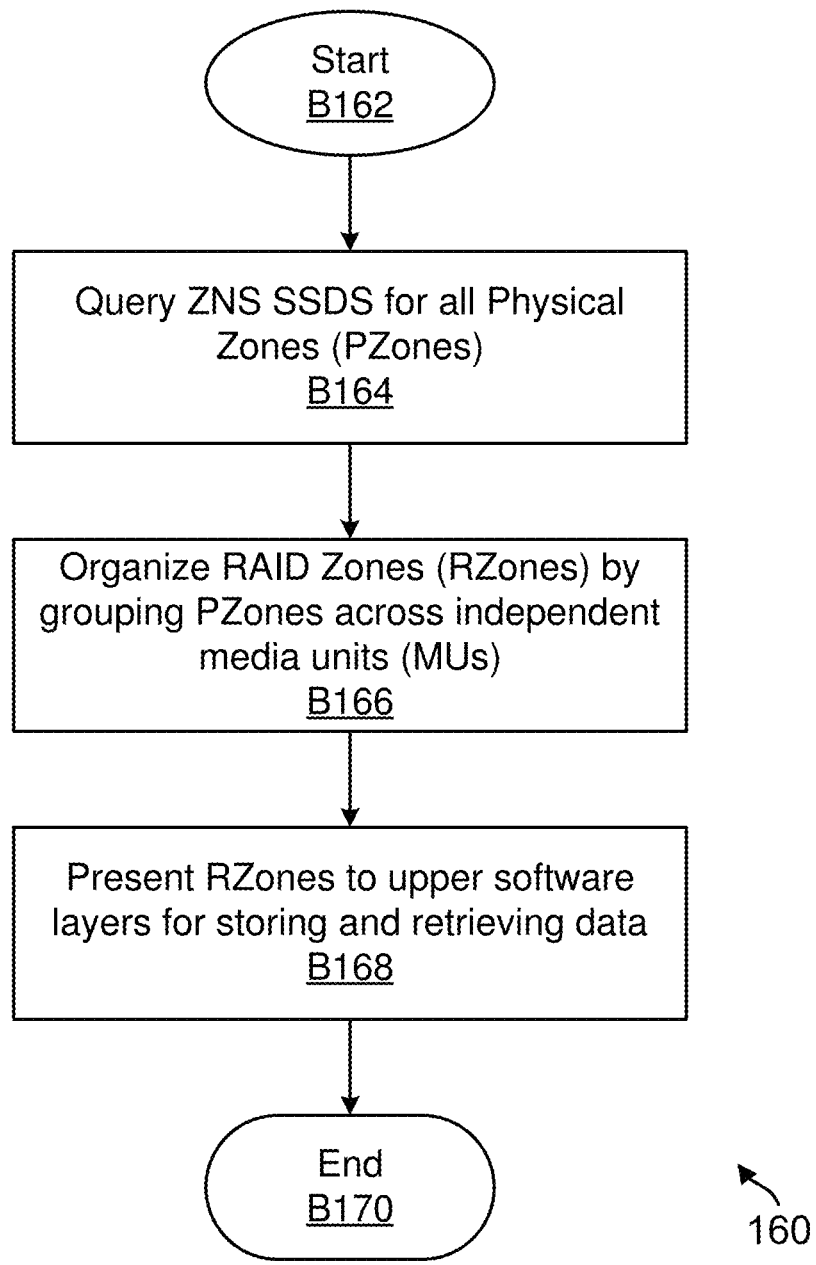
FIG. 1E shows a process for initializing PZones and RZones of a ZNS SSD, according to one aspect of the present disclosure.

PZone/RZone Initialization: FIG. 1E shows a process 160 for initializing the PZones and RZones by the TIER1 RAID layer 140, according to one aspect of the present disclosure. The process begins in block B162, before a ZNS SSD 110 is made available within the storage sub-system 112. In block B164, the TIER1 RAID layer 140 queries the ZNS SSDs for information regarding the PZones. Each ZNS SSD controller 102 executes firmware instructions out of a ZNS SSD memory. The controller 102 provides information regarding the PZones, which includes a PZone address, size, starting offset value or any other information that can identify the PZone.

In block B166, the TIER1 RAID layer 140 groups PZones across independent MUs (e.g., 120A-120E, FIG. 1B) to create RZones, e.g., 144 (FIG. 1D). Thereafter, in block B168, the RZones are presented to upper layers, e.g., the TIER2 RAID layer 136. The TIER2 RAID layer 136 can then present RZones (e.g., 146A, 146B, FIG. 1D) to other layers, e.g., the file system manager 134. The RZones and the PZones are then used for writing and retrieving data, as well as for storing parity data, as described below in detail. The process then ends in block B170.

Parity Generation: As mentioned above, the upper layers (e.g., the file system manager 134 and the TIER2 RAID layer 136) only see RZones (e.g., 146A/146B, FIG. 1D), hence all write I/Os that are received by the TIER1 RAID layer 140 target an RZone. The TIER1 RAID layer 140 issues child I/Os to PZones based on a range of blocks that are targeted by the RZone I/O sent by an upper software layer (134 or 136, FIG. 1D). The child I/Os are issued to write data that is temporarily stored at a plurality of I/O buffers (not shown) in a storage server memory. The TIER1 RAID layer 140 computes parity blocks for a parity PZone corresponding to the targeted RZone. The TIER1 RAID layer 140 issues a parity I/O for the computed parity stored at a parity buffer. The parity buffer may be designated within the storage server memory to store parity data. The parity data is computed by XORing the data in the I/O buffers. It is noteworthy that the parity buffer is written to the parity PZone and committed after all the blocks in a corresponding RZone stripe have been committed to the appropriate PZones.

Figure 2A:
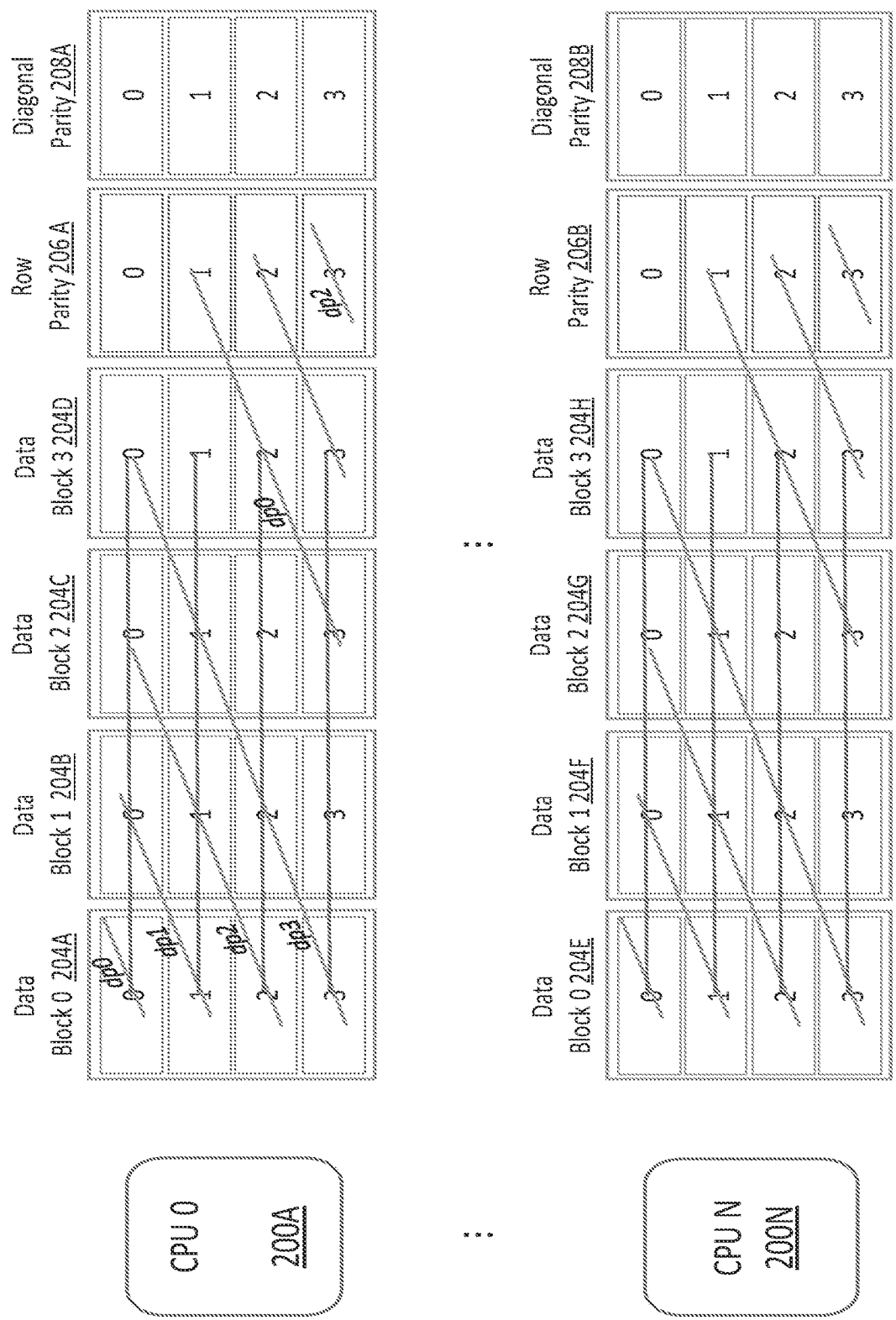
FIG. 2A shows a conventional technique for horizontal and diagonal parity generation.

Before describing the detailed innovative technology for determining horizontal and vertical parity of the present disclosure, a description of conventional parity determination will be helpful. FIG. 2A shows an example of a conventional parity determination system to determine horizontal and diagonal parity in a multi-processor environment. FIG. 2A shows multiple CPUs 200A-200N that calculate horizontal parity and diagonal parity. CPU 200A determines horizontal and diagonal parity for data blocks 204A-204D, while CPU 200N determines horizontal and diagonal parity for data blocks 204E-204H. As an example, each row of data in data blocks 204A-204H may fit in a cache line. A cache line is the smallest portion of data that can be mapped into a processor cache. A mapped cache line is associated with a core line, which is a corresponding region on a backend storage (e.g., ZNS SSDs 110A-110D). Both cache storage and the backend storage are split into blocks of the size of a cache line, and all the cache mappings are typically aligned to these blocks.

CPU 200A determines horizontal parity (may also be referred to as row parity) for row 0 and stores the horizontal parity 206A in a parity drive. CPU 200A loads data from each cache line to determine the horizontal parity and the diagonal parity 208A. The diagonal parity is shown as dp0, dp1, dp2, dp3 and so forth. Diagonal parity dp0 involves row 0, dp1 involves row 1 of data block 204A and row 0 of data block 204B. dp1 is determined after CPU 200A has already loaded row 0 and row 1 for data block 204A from a cache line. This approach is inefficient when both horizontal and vertical parity are determined because to determine vertical parity, CPU 200A will have to move data from a row that may have been assigned to CPU 200N i.e., data blocks that are owned by another CPU are loaded to determine vertical parity. This consumes additional processing cycles and hence is undesirable. The innovative technology disclosed herein solves this technical challenge, as described below in detail.

Figure 2B:
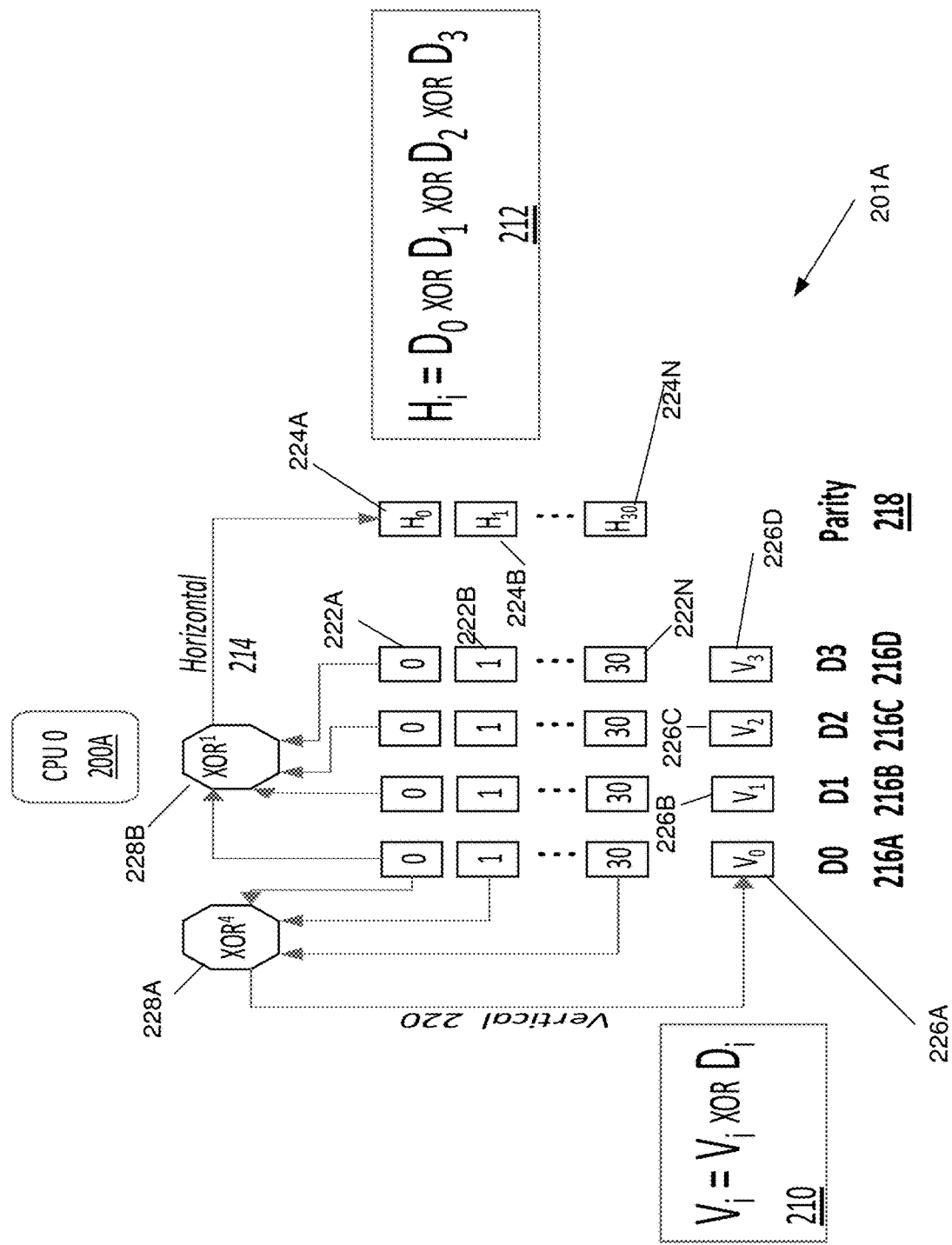
FIG. 2B shows a system for generating horizontal and vertical parity by a processor, according to one aspect of the present disclosure.

FIG. 2B shows a system 201A for efficiently generating horizontal and vertical parity, according to one aspect of the present disclosure. System 201A is based on using a single processor, shown as CPU0 200A. In one aspect, CPU 200A is a central processing unit ("CPU") of a storage server 108 or a processor of the storage device controller 102. In one aspect, CPU 200A is assigned a plurality of ZNS SSDs 216A-216D (similar to 110A-110D described above), shown as D0, D1, D2 and D3. The parity drive 218 is used to store horizontal parity 224A-224N for data stored in each row 222A-222N across the ZNS SSDs 216A-216D. The horizontal parity is determined by $H_i=D_0$ XOR $D_1$ XOR $D_2$ XOR $D_3$ (shown as 212) i.e., by XORing all the data stored in each row 222A-222N. For example, the parity for row 224A is determined by XORing the data in row 224A by a horizontal XOR module 228B, the parity for row 222B is determined by XORing all the data in row 222B and so forth.

The vertical parity 226A-226D is stored at each ZNS SSD. The vertical parity is determined by $V_i=V_i$ XOR $D_i$ (shown as 210) i.e., by XORing all the data stored in a vertical column/stripe by a vertical XOR module 228A. For example, data that is stored in row 222A and 222B are provided to the vertical XOR module 228A to determine a vertical parity involving data stored by the first and second row of a specific column. The XOR module 228A cycles through all the rows of each column to determine the vertical parity for the entire column i.e., 226A-222D.

Figure 2C:
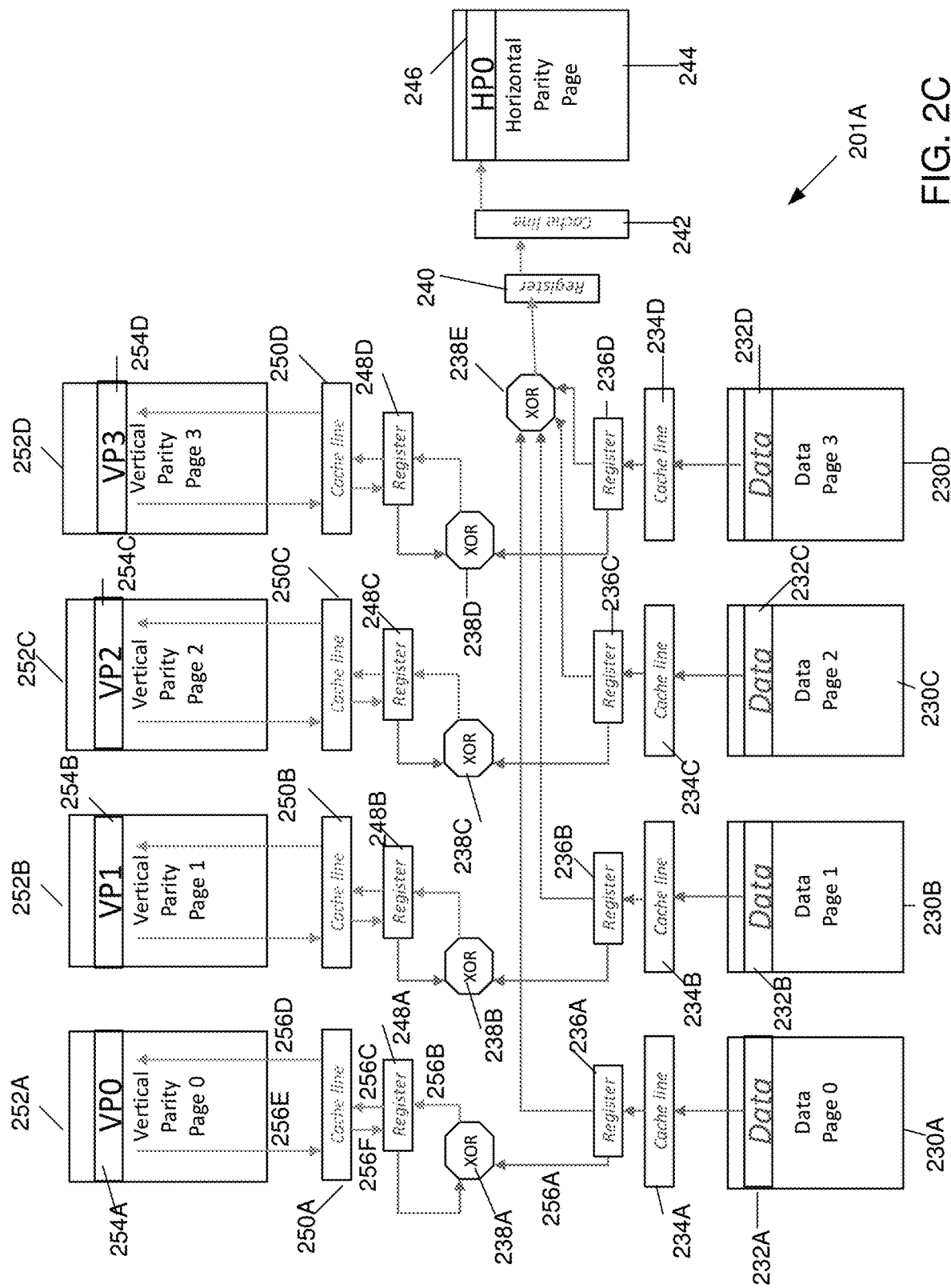
FIG. 2C shows the details of the system of FIG. 2B, according to one aspect of the present disclosure.

FIG. 2C shows a detailed block diagram of system 201A for determining the horizontal and vertical parity by CPU 200A, according to one aspect of the present disclosure. CPU 200A has access to a cache (not shown), where data is stored in cache lines, e.g., 234A-234D and 250A-250D described below in detail.

In one aspect, a data page 230A-230D of ZNS SSDs 216A-216D stores data for each ZNS SSD 230A-230D. The data page indicates the smallest segment in which data is written to or read from ZNS SSDs 216A-216D. Each data page is configured to store a plurality of data portions, e.g., 232A-232D sized to fit into a single cache line, e.g., 234A-234D. To determine horizontal parity, data from the cache line 234A-234D is transferred to horizontal parity registers 236A-236D (may also be referred to as registers 236A-236D or first register 236A-236D). The data from registers 236A-236D is XORed by the horizontal XOR module 238E (may also be referred to as XOR module 238E (similar to 228B shown in FIG. 2B)). The horizontal parity from XOR module 238E is transferred to another register 240 (may also be referred to as a third register) and then to a cache line 242. The horizontal parity is then stored as HP0 246 within a horizontal parity page 244.

To determine vertical parity for each data page 230A-230D, data from the horizontal parity registers 236A-236D is copied to each corresponding vertical XOR module 238A-238D (similar to XOR module 228A of FIG. 2B), respectively, when the data is provided to the horizontal XOR module 238E.

The following description provides details to determine vertical parity for data stored at data page 0 230A including the data portion 232A. The same mechanism is applicable to data pages 230B-230D that store data portions 232B-232D. As an example, while horizontal parity is being determined by the XOR module 238E, data from register 236A is copied to the vertical XOR module 238A. This is shown by arrow 256A. The vertical XOR module 238A determines the vertical parity using the data from register 236A and a previous vertical parity determined from a previous cycle and provided to the XOR module 238A, as shown by arrows 256E and 256F. The vertical parity determined by XOR module 238A for a current cycle is transferred to a vertical parity register 248A (may also be referred to as a second register). This is shown by arrow 256B. The vertical parity from register 248A is transferred to a cache line 250A, as shown by arrow 256C. The vertical parity from the cache line 250A is then transferred to the vertical parity page 0 252A. This is shown by arrow 256D.

It is noteworthy that the vertical parity is determined by the vertical XOR module 238A in a loop i.e., as data is moved from register 236A in one cycle, the vertical parity determined from a previous cycle is provided to the vertical XOR module 238A, as shown by arrows 256E and 256F. The data from register 236A and the parity from the previous cycle are XORed. This continues until the last row of data (e.g., 222N, FIG. 2B) for data page 0 230A has been XORed with the vertical parity comprising of rows 0 to the second last row.

The mechanism used above for data page is also used for data page 1 230B with the data portion 232B, data page 2 230C with the data portion 232C and data page 3 230D with the data portion 232D using cache lines 234B-234D, registers 236B-236D, vertical XOR modules 238B-238D, registers 248B-248D, and cache lines 250B-250D, respectively. Similar to vertical parity 254A stored in vertical parity page 252A, the vertical parity 254B, 254C and 254D are stored in vertical parity pages 252B, 252C and 252D, respectively.

Because data for determining horizontal and vertical parity are provided the vertical and horizontal XOR modules simultaneously, CPU 200A can efficiently determine both the horizontal and vertical parity almost simultaneously, without having to ask for data from other CPUs and reloading cache lines.

Figure 2D:
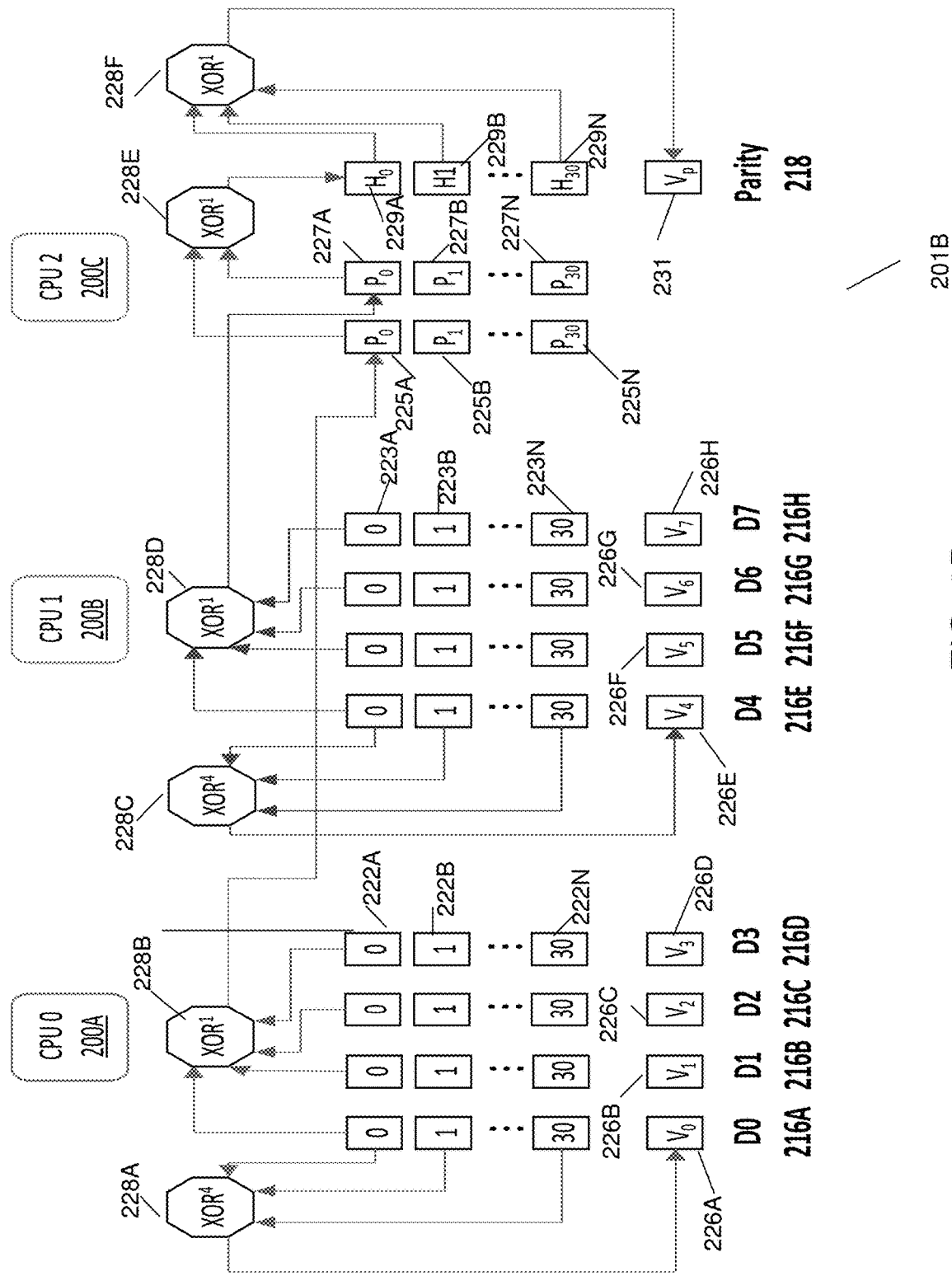
FIG. 2D shows a multi-processor system for generating horizontal and vertical parity, according to one aspect of the present disclosure.

FIG. 2D shows a multi-processor system 201B with a plurality of CPUs 200A-200C to efficiently determine both horizontal and vertical parity for data stored across a plurality of ZNS SSDs 216A-216H (similar to 110A-110D, FIG. 1B). CPU 200A is assigned ZNS SSDs 216A-216D, while CPU 200B is assigned ZNS SSDs 216E-216H. CPU 200A using the XOR module 228A determines the vertical parity 226A-226D for data stored at ZNS SSDs 216A-216D, as described above with respect to FIGS. 2B and 2C, respectively. CPU 200B using the XOR module 228C determines the vertical parity 226E-226H for data stored at ZNS SSDs 216E-216H, respectively, as described above with respect to FIGS. 2B and 2C.

CPU 200A also determines the horizontal parity 225A-225N for rows 222A-222N using XOR module 228B, as described above with respect to FIGS. 2B/2C. The horizontal parity 225A-222N for each row 222A-222N is stored at the parity drive 218. CPU 200B determines the horizontal parity 227A-227N for rows 223A-223N using the horizontal XOR module 228D. The horizontal parity 227A-227N for each row 223A-223N is also stored at parity drive 218. CPU 200C determines the horizontal parity 229A-229N across all rows of ZNS SSDs 216A-216H by XORing the partial horizontal parity 225A-225N and 227A-227N using the horizontal parity XOR module 228E.

The horizontal parity 229A-229N of each row is used to determine the vertical parity 231 using the vertical parity XOR module 228F. The vertical parity 231 is determining by cycling through the horizontal parity 229A-229N by the vertical parity XOR nodule 228F, as described above with respect to FIGS. 2B and 2C.

Figure 2E:
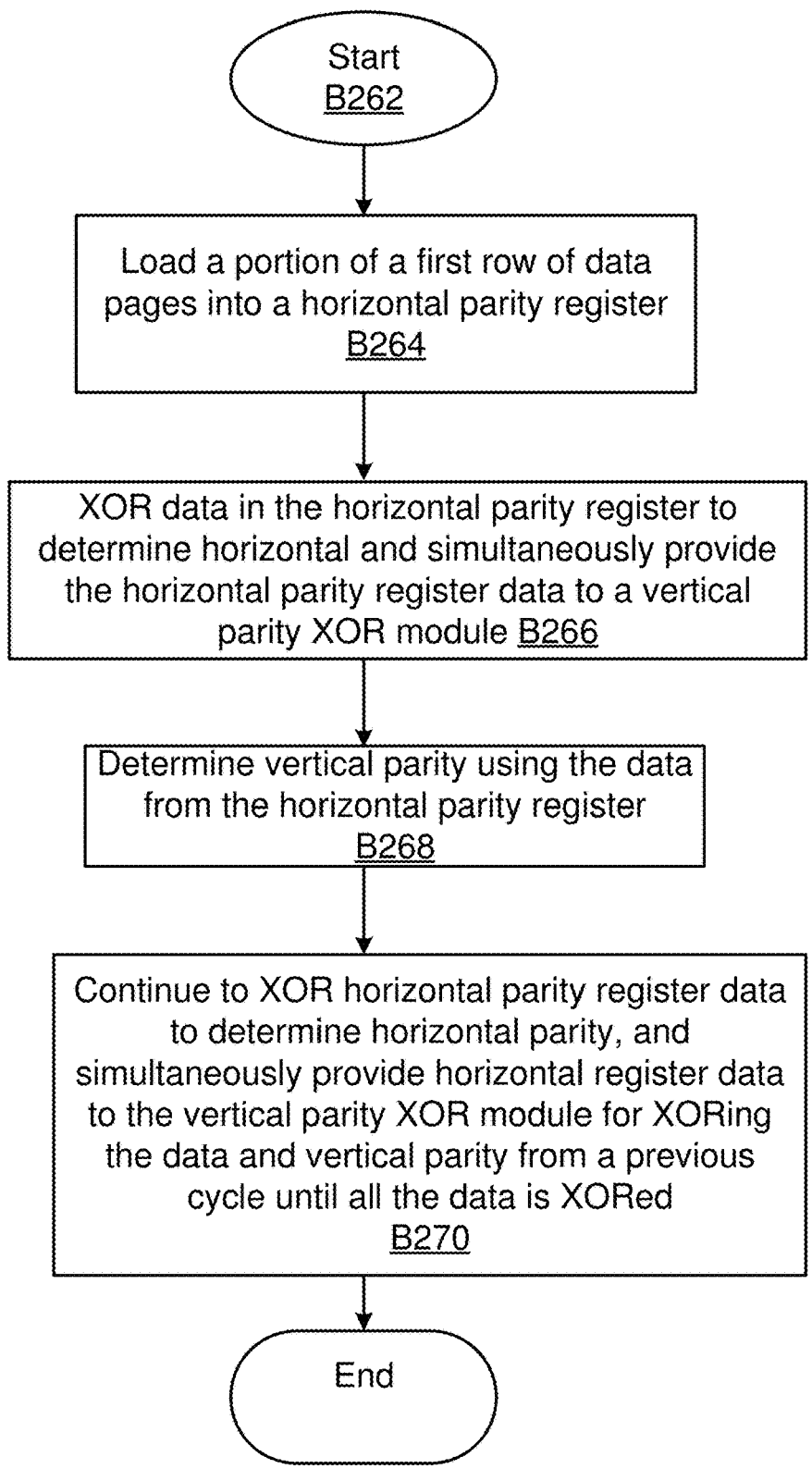
FIG. 2E shows a process for generating horizontal and vertical parity, according to one aspect of the present disclosure.

Process Flows: FIG. 2E shows a process 260 for efficiently determining both horizontal and vertical parity by a processor (e.g., CPU 200A, FIGS. 2B/2C). In one aspect, process 260 is described with respect to the system 201A of FIGS. 2B/2C described above in detail.

Process 260 begins when data is being written to ZNS SSDs 216A-216D. In one aspect, data is written at a page level, e.g., data pages 230A-230D of FIG. 2C. In block B264, a portion of the data page (e.g., 232A-232D) is loaded into horizontal parity registers 236A-236D via cache lines 234A-234D.

In block B266, data from registers 236A-236D are XORed by the horizontal XOR module 238E (FIG. 2C) or 228B (FIG. 2B) to determine the horizontal parity for data stored across ZNS SSDs 216A-216D. At the same time, data from registers 236A-236D is provided to the vertical parity XOR modules 238A-238D to determine the vertical parity in block B268. The vertical parity for a current cycle is determined by XORing data from registers 236A-236D and a vertical parity retrieved from a previous cycle, as shown by arrows 256E and 256F.

The process of blocks B266 and B268 continue in block B270 until the process cycles through all the stored data to determine the horizontal parity across a plurality of rows. The vertical parity is determined by the vertical XOR modules 238A-238D by cycling through data from registers 236A-236D as well as the vertical parity from registers 248A-248D, as shown in FIG. 2C.

Because data from registers 236A-236D is used to simultaneously determine the horizontal and vertical parities, CPU 200A can efficiently perform this task by moving data from the cache lines 234A-234D to the XOR modules, without cache line reloading. In a multi-processor environment, as described below, CPU 200A does not need to obtain information from another CPU to determine vertical parity.

Figure 2F:
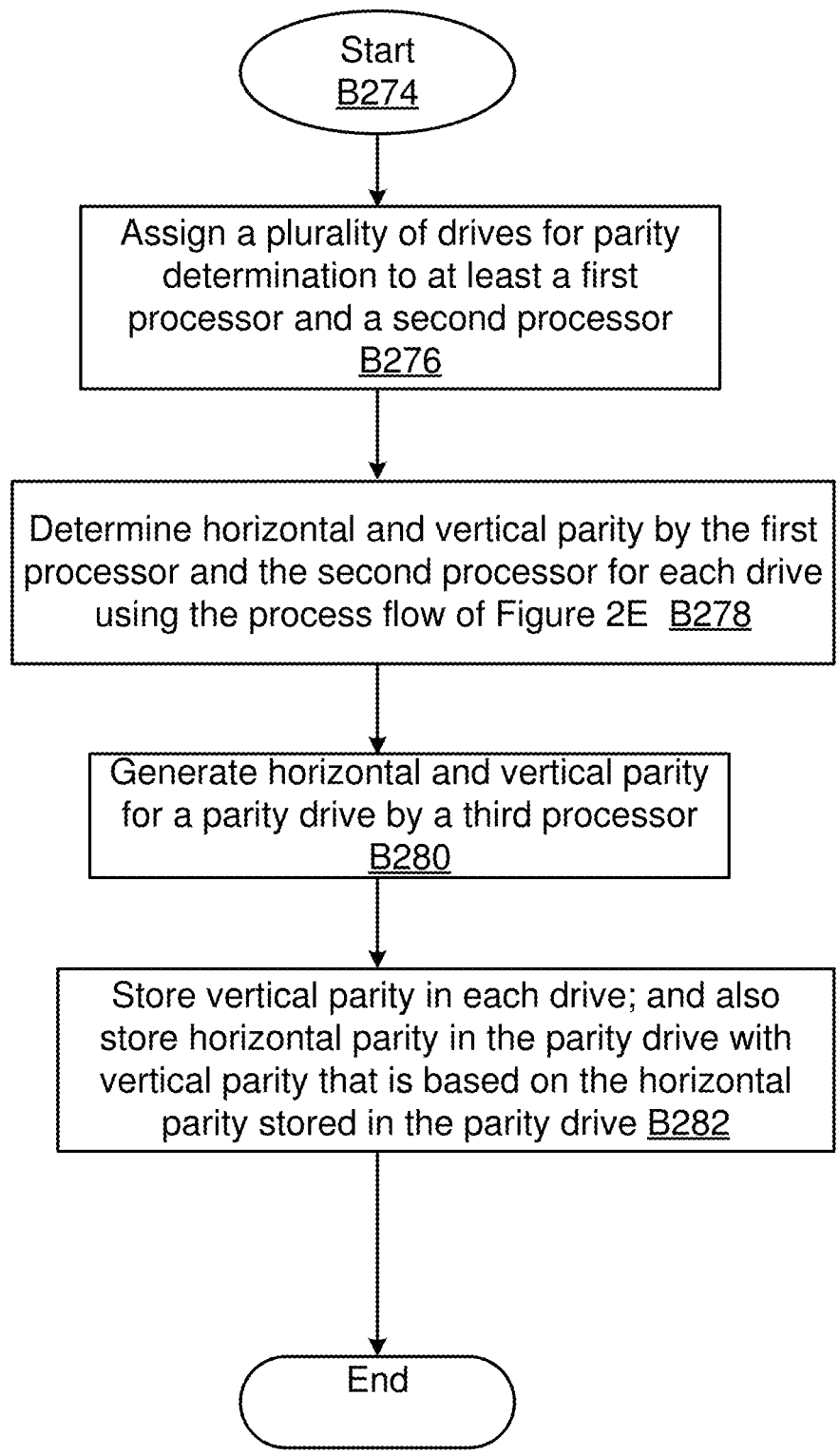
FIG. 2F shows another process for generating horizontal and vertical parity, according to one aspect of the present disclosure.

FIG. 2F shows a process 272 for efficiently determining horizontal and vertical parity in a multi-processor environment 201B, as shown in FIG. 2D and described above. Process 274 begins in block B274. In block B276, each processor is assigned a plurality of ZNS SSDs. For example, CPU 200A is assigned SSDs 216A-216D, while processor 200B is assigned ZNS SSDs 216E-216H, as shown in FIG. 2D.

In block B278, each CPU 200A and 200B determines horizontal parity and vertical parity using the process 260 of FIG. 2E described above in detail.

In block B280, the third CPU 200C determines the horizontal parity 229A-229N and the vertical parity 231 using XOR modules 228E and 228F, as shown in FIG. 2D.

In block B282, the vertical parity 226A-226H is stored at each ZNS SSD. The horizontal parity 229A-229N is stored at the parity ZNS SSD 218 with the vertical parity 231 determined from the horizontal parity 229A-229N.

The innovative technology disclosed herein enables multiple processors (e.g., 200A and 200B) to determine horizontal and vertical parity across assigned ZNS SSDs. One of the processors (e.g., 200C) can start determining horizontal parity and vertical immediately after 200A and 200B have determined the parity for the first row across ZNS SSDs 216A-216H. When CPU 200A and 200B have completed process 260 of FIG. 2E, a cycle later, CPU 200C completes process blocks B280 and B282.

In one aspect, innovative computing technology for a method is provided. The method includes providing, by a first processor (e.g., 200A, FIG. 2D), for a current cycle, a data unit from a first register (e.g., 236A, FIG. 2C) corresponding to each zoned solid-state drive (ZNS SSD) of a first ZNS SSD set (e.g., 216A-216D, FIG. 2B) of a storage system to a first vertical parity XOR module (e.g. 238A-238D) corresponding to each ZNS SSD of the first ZNS SSD set, and simultaneously determining a first partial horizontal parity (e.g., 225A-225N, FIG. 2D) using the data unit stored in the first register of each ZNS SSD of the first ZNS SSD set; determining, by the first processor, a vertical parity (e.g., 226A-226D, FIG. 2D) for each ZNS SSD of the first ZNS SSD set using the data unit provided to the first vertical parity XOR module in the current cycle and vertical parity determined from a previous cycle.

The method further includes providing, by a second processor (e.g. 200B), for the current cycle, a data unit from a second register corresponding to each ZNS SSD (e.g. 216E-216H) of a second ZNS SSD set of the storage system to a second vertical parity XOR module corresponding to each ZNS SSD of the second ZNS SSD set, and simultaneously determining a second partial horizontal parity using the data unit stored in the second register of each ZNS SSD of the second ZNS SSD set; determining, by the second processor, a vertical parity for each ZNS SSD of the second ZNS SSD set using the data unit provided to the second vertical parity XOR module in the current cycle and vertical parity determined from the previous cycle;

The method further includes utilizing, by a third processor (e.g. 200C), the first and second partial horizontal parity (e.g. 225A-225N and 227A-227N) to determine horizontal parity for data stored across each row of each ZNS SSD of the first and second ZNS SSD sets, the horizontal parity stored in a parity drive (e.g., 218, FIG. 2D); and determining, by the third processor, a vertical parity (e.g., 231, FIG. 2D) for the parity drive from the horizontal parity stored at each row of the parity drive.

In another aspect, a non-transitory, machine-readable storage medium having stored thereon instructions for performing a method (e.g., 260 and/or 262), comprising machine executable code which when executed by at least one machine, causes the machine to: copy a data unit from a first temporary storage location (e.g., 236A, FIG. 2C) corresponding to each zoned solid-state drive (ZNS SSD) (e.g., 216A-216D, FIG. 2B) of a first ZNS SSD set of a storage system to a first XOR module (e.g., 238A, FIG. 2C), while determining a first partial horizontal parity using the data unit stored in the first temporary storage location; and determine a vertical parity for each ZNS SSD of the first ZNS SSD set using the data unit provided to the first XOR module in a current cycle and vertical parity determined from a previous cycle.

Figure 3:
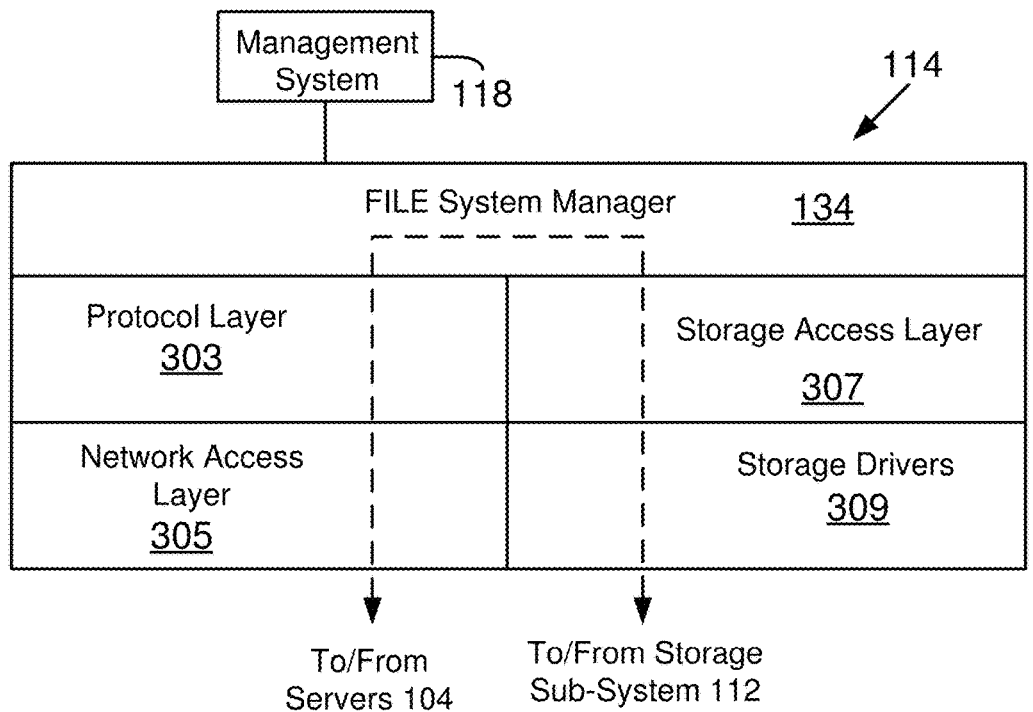
FIG. 3 shows an example of a storage operating system, used according to one aspect of the present disclosure.

Storage Operating System: FIG. 3 illustrates a generic example of operating system 114 executed by storage server 108, according to one aspect of the present disclosure. Storage operating system 114 interfaces with the storage sub-system 112 as described above in detail.

As an example, operating system 114 may include several modules, or "layers". These layers include a file system manager 134 that keeps track of a directory structure (hierarchy) of the data stored in storage devices and manages read/write operations, i.e., executes read/write operations on disks in response to server system 104 requests.

Operating system 114 may also include a protocol layer 303 and an associated network access layer 305, to allow storage server 108 to communicate over a network with other systems, such as server system 104, and management console 118. Protocol layer 303 may implement one or more of various higher-level network protocols, such as NFS, CIFS, Hypertext Transfer Protocol (HTTP), TCP/IP and others.

Network access layer 305 may include one or more drivers, which implement one or more lower-level protocols to communicate over the network, such as Ethernet. Interactions between server systems 104 and the storage sub-system 112 are illustrated schematically as a path, which illustrates the flow of data through operating system 114.

The operating system 114 may also include a storage access layer 307 and an associated storage driver layer 309 to communicate with a storage device. The storage access layer 307 may implement a higher-level disk storage protocol, such as TIER2 RAID layer 136, ZTL 138 and TIER1 RAID layer 140, while the storage driver layer 309 may implement a lower-level storage device access protocol, such as the NVMe protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage server 108.

As used herein, the term "storage operating system" generally refers to the computer-executable code operable on a computer to perform a storage function that manages data access and may implement data access semantics of a general-purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
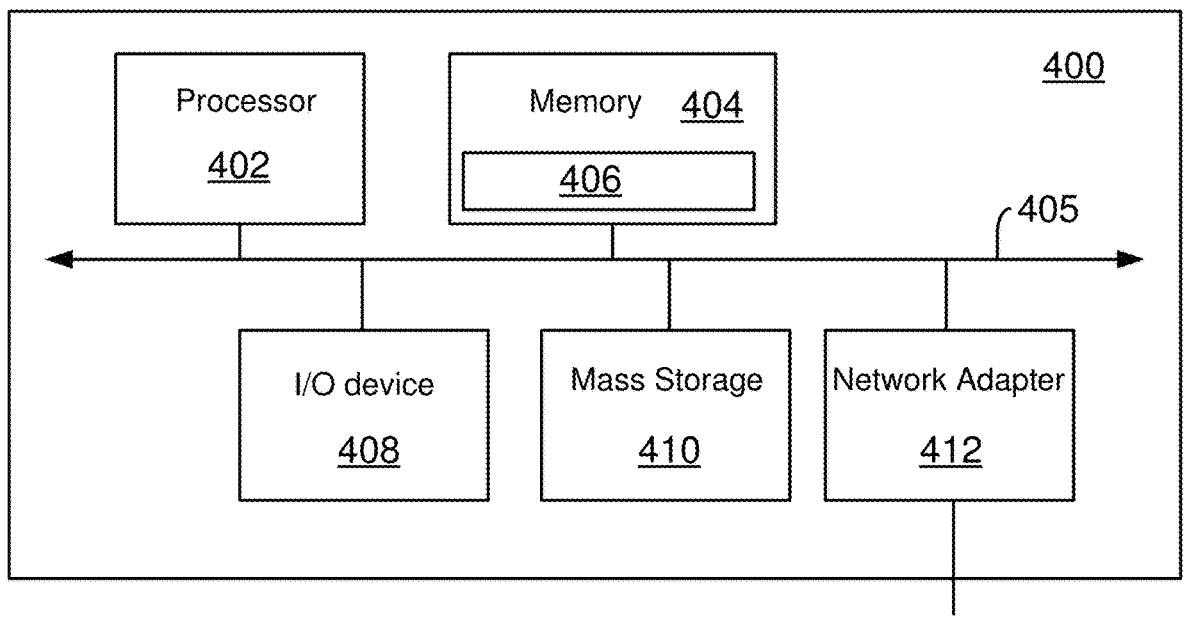
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent the storage server 108, the management console 118, server systems 104, and others. Note that certain standard and well-known components which are not germane to the present invention are not shown in FIG. 4.

The processing system 400 includes one or more processors 402 (similar to CPUs 200A-200C, described above) and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for executing the process blocks of FIGS. 1E, and 2E-2F.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and especially useful in the cloud computing environment where storage at ZNS 110 is presented and shared across different platforms. Cloud computing means computing capability that provides an abstraction between the computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure, followed by a "server" layer that includes hardware and computer software designed for cloud specific services. The storage systems described above may be a part of the server layer for providing storage services. Details regarding these layers are not germane to the inventive aspects.

Thus, a method and apparatus for protecting data using ZNS SSDs within system 100 have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising;
    providing, by a first processor, for a current cycle, a data unit stored by each zoned namespace solid-state drive (ZNS SSD) of a first ZNS SSD set of a storage system to a first vertical parity XOR module corresponding to each ZNS SSD of the first ZNS SSD set, and simultaneously determining a first partial horizontal parity using the data unit of each ZNS SSD of the first ZNS SSD set;
    determining, by the first processor, a vertical parity for each ZNS SSD of the first ZNS SSD set using the data unit of each ZNS SSD of the first ZNS SSD set provided to the first vertical parity XOR module in the current cycle and a vertical parity for each ZNS SSD of the first ZNS SSD set determined from a previous cycle;
    providing, by a second processor, for the current cycle, a data unit stored by each ZNS SSD of a second ZNS SSD set of the storage system to a second vertical parity XOR module corresponding to each ZNS SSD of the second ZNS SSD set, and simultaneously determining a second partial horizontal parity using the data unit of each ZNS SSD of the second ZNS SSD set;
    determining, by the second processor, a vertical parity for each ZNS SSD of the second ZNS SSD set using the data unit of each ZNS SSD of the second ZNS SSD set provided to the second vertical parity XOR module in the current cycle and a vertical parity for each ZNS SSD of the second ZNS SSD set determined from the previous cycle;
    utilizing, by a third processor, the first and second partial horizontal parity to determine horizontal parity for data stored across each row of each ZNS SSD of the first and second ZNS SSD sets, the horizontal parity stored in a parity drive; and
    determining, by the third processor, a vertical parity for the parity drive from the horizontal parity stored at each row of the parity drive.

2. The method of claim 1, further comprising:
    storing, by the first processor, the data unit of each ZNS SSD of the first ZNS SSD set in a first register of each ZNS SSD of the first ZNS SSD set; and
    transferring, by the first processor, the data unit of each ZNS SSD of the first ZNS SSD set from a cache line to the first register of each ZNS SSD of the first ZNS SSD set.

3. The method of claim 1, wherein the first partial horizontal parity, the second partial horizontal parity and vertical parity for each ZNS is determined by a redundant array of independent disk (RAID) layer of the storage system.

4. The method of claim 1, wherein determining the first partial horizontal parity further comprising:
    XORing, by the first processor, the data unit of each of the first register corresponding to each ZNS SSD of the first ZNS SSD set.

5. The method of claim 1, wherein determining, by the third processor, the vertical parity further comprising:
    XORing, by the third processor, the horizontal parity of each row of the parity drive.

6. The method of claim 1, wherein the first partial horizontal parity, the second partial horizontal parity and the vertical parity for each ZNS SSD of the first and second ZNS SSD set is determined by a processor executable Zone Transfer Layer (ZTL) of the storage system, the ZTL interfacing with a RAID layer and a storage sub-system comprising the first ZNS SSD set and the second ZNS SSD set.

7. The method of claim 1, further comprising:
    storing, by the third processor, the horizontal parity to a third register and
    transferring the horizontal parity from the third register to the parity drive.

8. A non-transitory machine-readable storage medium having stored thereon instructions for performing a method, comprising machine executable code which when executed by a machine, causes the machine to:
    copy a data unit from a first temporary storage location of each zoned namespace solid-state drive (ZNS SSD) of a first ZNS SSD set of a storage system to a first XOR module of each ZNS SSD of the first ZNS SSD set, while determining a first partial horizontal parity using the data unit stored in each of the first temporary storage location of each ZNS SSD of the first ZNS SSD set; and
    determine a vertical parity for each ZNS SSD of the first ZNS SSD set using the data unit provided to the first XOR module of each ZNS SSD of the first ZNS SSD set in a current cycle and a vertical parity determined from a previous cycle for each ZNS SSD of the first ZNS SSD set.

9. The non-transitory machine-readable storage medium of claim 8, wherein the machine executable code which when executed, further causes the machine to:

copy a data unit from a second temporary storage location of each ZNS SSD of a second ZNS SSD set of the storage system to a second XOR module corresponding to each ZNS SSD of the second ZNS SSD set, while determining a second partial horizontal parity using the data unit stored in the second temporary storage location of each ZNS SSD of the second ZNS SSD set; and determine a vertical parity for each ZNS SSD of the second ZNS SSD set using the data unit provided to the second XOR module of each ZNS SSD of the second ZNS SSD set in the current cycle and a vertical parity of each ZNS SSD of the second ZNS SSD set determined from the previous cycle.

10. The non-transitory, machine-readable storage medium of claim 9, wherein the machine executable code which when executed, further causes the machine to:

utilize the first and second partial horizontal parity to determine horizontal parity for data stored across each row of each ZNS SSD of the first and second ZNS SSD sets, the horizontal parity stored in a parity drive; and determine a vertical parity for the parity drive from the horizontal parity stored at each row of the parity drive.

11. The non-transitory, machine-readable storage medium of claim 8, wherein the machine executable code which when executed, further causes the machine to:

transfer the data unit from a cache line to the first temporary storage location of each ZNS SSD of the first ZNS SSD set.

12. The non-transitory, machine-readable storage medium of claim 8, wherein the machine executable code which when executed, further causes the machine to:

determine the vertical parity of the parity drive by XORing the horizontal parity of each row of the parity drive.

13. The non-transitory, machine-readable storage medium of claim 12, wherein the machine executable code which when executed, further causes the machine to:

determine the first partial horizontal parity from each data unit stored in the first temporary storage location of each ZNS SSD of the first ZNS SSD set by XORing the data unit of each of the first temporary storage location of each ZNS SSD of the first ZNS SSD set.

14. A system comprising:

a memory containing non-transitory machine readable medium comprising machine executable code having stored thereon instructions; and a processor module coupled to the memory; the processor module configured to execute the machine executable code to:

copy a data unit from a first temporary storage location of each zoned namespace solid-state drive (ZNS SSD) of a first ZNS SSD set of a storage system to a first XOR module of each ZNS SSD of the first ZNS SSD set, while determining a first partial horizontal parity using the data unit stored in each of the first temporary storage location of each ZNS SSD of the first ZNS SSD set; and determine a vertical parity for each ZNS SSD of the first ZNS SSD set using the data unit provided to the first XOR module of each ZNS SSD of the first ZNS SSD set in a current cycle and a vertical parity determined from a previous cycle for each ZNS SSD of the first ZNS SSD set.

15. The system of claim 14, wherein the machine executable code further causes to:

copy a data unit from a second temporary storage location of each ZNS SSD of a second ZNS SSD set of the storage system to a second XOR module corresponding to each ZNS SSD of the second ZNS SSD set, while determining a second partial horizontal parity using the data unit stored in the second temporary storage location of each ZNS SSD of the second ZNS SSD set; and determine a vertical parity for each ZNS SSD of the second ZNS SSD set using the data unit provided to the second XOR module of each ZNS SSD of the second ZNS SSD set in the current cycle and a vertical parity of each ZNS SSD of the second ZNS SSD set determined from the previous cycle.

16. The system of claim 15, wherein the machine executable code further causes to:

utilize the first and second partial horizontal parity to determine horizontal parity for data stored across each row of each ZNS SSD of the first and second ZNS SSD sets, the horizontal parity stored in a parity drive; and determine a vertical parity for the parity drive from the horizontal parity stored at each row of the parity drive.

17. The system of claim 15, wherein the first partial horizontal parity, the second partial horizontal and vertical parity for each ZNS SSD of the first and second ZNS SSD set is determined by a Zone Transfer Layer (ZTL) of the storage system, the ZTL interfacing with a RAID layer and a storage sub-system comprising the first ZNS SSD set and the second ZNS SSD set.

18. The system of claim 14, wherein the machine executable code further causes to:

transfer the data unit from a cache line to the first temporary storage location of each ZNS SSD of the second ZNS SSD set.

19. The system of claim 14, wherein the machine executable code further causes to:

determine the vertical parity of the parity drive by XORing the horizontal parity of each row of the parity drive.

20. The system of claim 14, wherein the machine executable code further causes to:

determine the first partial horizontal parity from each data unit stored in the first temporary storage location each ZNS SSD of the first ZNS SSD set by XORing the data unit of each of the first temporary storage location of each ZNS SSD of the first ZNS SSD set.

* * * * *